March 17, 1964 R. E. GRAVES 3,125,749

INFORMATION LOCATING MEANS FOR MATERIAL STORED ON FILM ROLLS

Filed Aug. 1, 1961 2 Sheets-Sheet 1

INVENTOR.
ROGER E. GRAVES
BY Walter S. Paul
ATTORNEY.

March 17, 1964 R. E. GRAVES 3,125,749

INFORMATION LOCATING MEANS FOR MATERIAL STORED ON FILM ROLLS

Filed Aug. 1, 1961 2 Sheets-Sheet 2

INVENTOR.
ROGER E. GRAVES
BY Walter S. Paul
ATTORNEY.

United States Patent Office 3,125,749

Patented Mar. 17, 1964

3,125,749

INFORMATION LOCATING MEANS FOR MATERIAL STORED ON FILM ROLLS

Roger E. Graves, 3554 Military Road, Arlington, Va.

Filed Aug. 1, 1961, Ser. No. 134,064
3 Claims. (Cl. 340—174.1)

Figure 1:
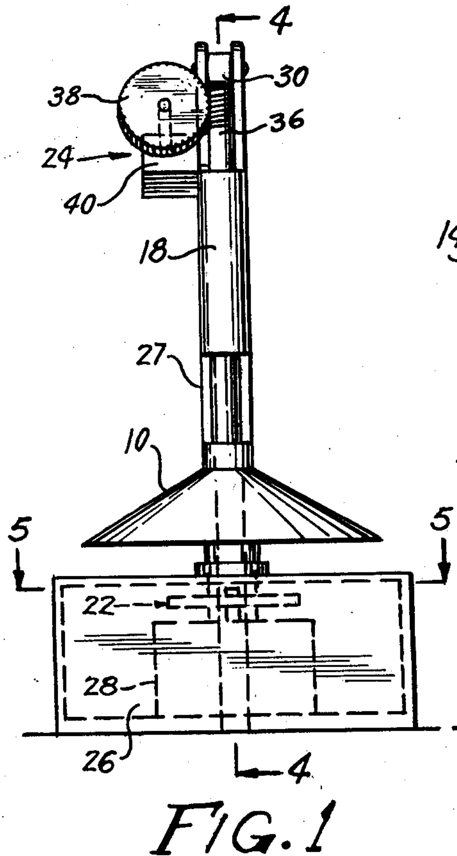

This invention relates to write, search, storage, read and retrieval devices for magnetic tape and magnetic tape-edged photographic film.

The primary object of this invention is to provide a rapid non-sequential search method for information stored on reels of magnetic tape and for information in the form of images stored on reels of exposed and developed photographic film.

Much information is now stored on various forms of recording, among them being magnetic drums and magnetic tape. Magnetic drums provide a rapid search and retrieval capability that is not possessed by magnetic tape storage. In magnetic tape storage, the information is usually stored on plastic tape coated with a thin layer of magnetic oxide. The tape is passed from reel to reel by means of a motor-driven transport mechanism through a sensing device comprising an air gap or read-write head on the magnetic coating side of the tape. As the tape passes the gap, a magnetic field is established in the head. The voltage induced from the magnetic field constitutes the output of the sensing device.

The information stored in rolls, whether it be on magnetic or photographic tape or film may have a coded magnetic edge, recording a binary coded decimal or other numbers system, designating the corresponding "bits" of information on the tape or film. Each code element consists of an area on the tape edge having a direction of magnetism. Several methods are used to indicate the different bits, chief among them being alternate clockwise and counter-clockwise magnetism or a magnetized area and a non-magnetized area. Each area is read in sequence as the tape passes the recording head.

The disadvantage of reading information from the edge of magnetic tape or film, by passing it from reel to reel, is the relatively long access or retrieval time. The information being searched for at a particular time may be out at the far end of the tape or film and several minutes of tape transport may be required to bring it under the reading head.

In order to overcome the deficiency in search and retrieval time that is inherent in tape or film storage on reels and the required sequential mode of search, this invention consists of a new configuration for the storage reels. The geometry of the reels is such that it may be used either for reels of magnetic tape or for reels of film ranging from the narrowest to the widest, having magnetic tape stored information along the edge of the film.

It is therefore an object of the present invention to provide a magnetic coding edge on tape or film records, and reels for storing these records in conical rolls for exposing the coding edge so it may be scanned at a plurality of portions of the roll simultaneously and without unwinding the roll. During this scanning by means of a multi-head pick-up device, the output signal from each recording head is compared with a stored or input signal so that matching signals will actuate the mechanism and indicate the position in the roll where the information sought may be found.

Figure 2:
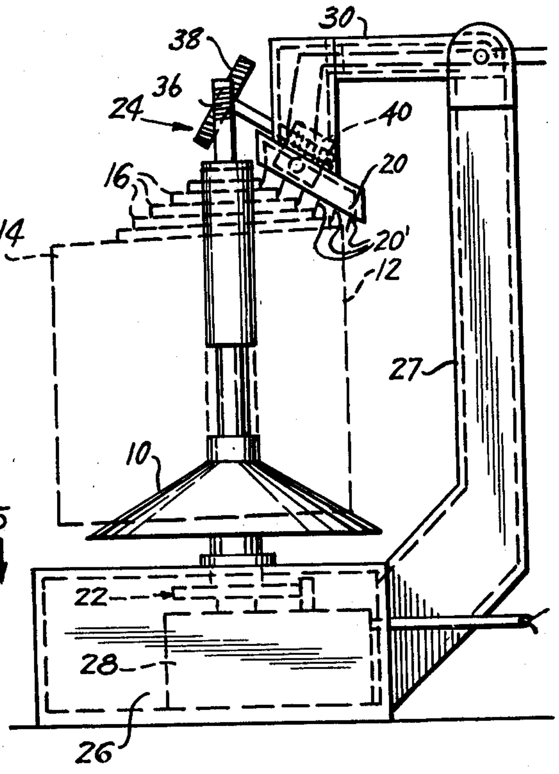
Figure 3:
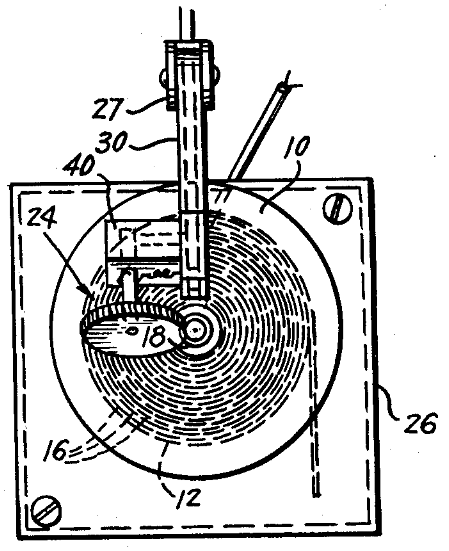
Figure 5:
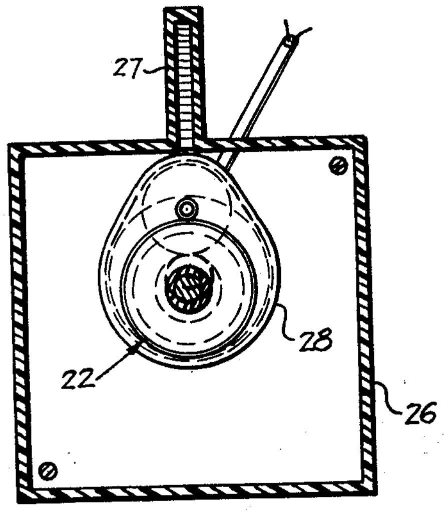
Figure 4:
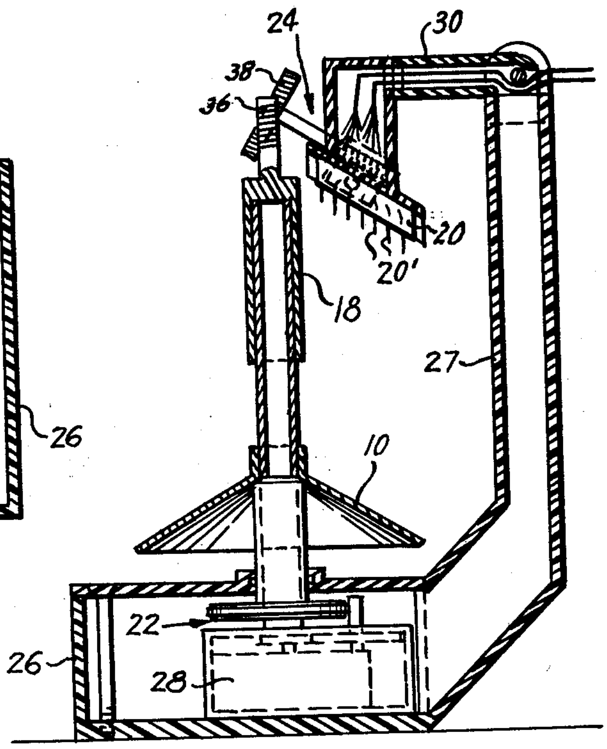
Figure 6:
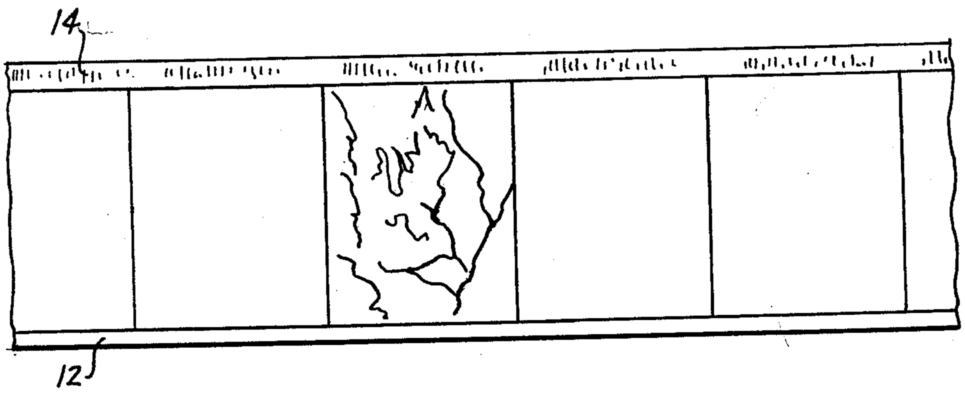

A form of the apparatus that may be used in this scanning process to find the location of desired information is illustrated in the accompanying drawings, wherein:

FIG. 1 is a front elevation of a preferred form of roll scanning device made in accordance with the present invention, FIG. 2 is a side elevational view of the same, FIG. 3 is a plan view thereof, FIG. 4 is a vertical sectional view taken on the line 4—4 of FIG. 1, FIG. 5 is a horizontal sectional view taken on the line 5—5 of FIG. 1, and FIG. 6 is a view of a photographic film having a magnetic edge for recording the coding designating the corresponding photos by coded signals.

The storage reels are constructed with a base flange 10 formed in the shape of a circular cone. This flange holds the film 12 that is stored on the reel, so that the upper edge 14 of the tape or film also approximates a circular cone. Actually the cone is formed by a series of successive spiral turns 16 of the continuous edge, each inner turn being smaller than the next outer one by the thickness of the film or tape and each showing a substantially cylindrical surface that has a height that is a function of the height to base ratio of the conical flange that it rests on.

The construction of the storage reels differs from previous methods in that the tape or film is wound on the spindle 18 and against the flange 10 in a manner that the exposed edge 14 (or edge opposite the flange) forms a surface generally approximating the surface of a cone and actually consisting of a series of concentric substantially cylindrical surfaces, each above and slightly smaller than the previous one.

In operation, this constitutes a novel and useful improvement over previous tape storage reels. With previous reels, using disk-shaped flanges, it was necessary to transport the film past the reading head by unwinding the tape from one reel and winding it on the opposite storage reel. With this cone-shaped flange configuration, it is possible using a slidable rack 20 with one or more reading heads 20', to read the entire tape stored along the edge by simply rotating the reel without unwinding the tape, and scanning the edge of the tape. This provides an access time comparable to that of a magnetic drum while still providing the greater storage capacity of magnetic tape reels.

The construction of the reels may be varied from a geometric shape having a small dimension in the height of the cone formed to a flange forming a steep cone. In the first instance, the scanning storage and retrieval could be faster while in the second instance, the detail of signals searched could be greater. This last is, of course, due to the greater area of each individual circle of tape that will be presented for scanning.

In construction and use, the storage reels could be either large or small, used singly or in batteries, and be scanned by any practical number of reading heads, depending upon the speeds and capacities desired in the design of the storage or memory units. Obviously, many modifications and variations are possible within the basic geometric configuration.

The features that are described herein and that are believed to be new, are the concept of magnetic tape or magnetic tape edged photographic film being stored in novel form allowing a search capability at the circumference of a series of concentric cylinders, rather than searching the tape or film sequentially by transporting it past a reading head, and the concept of several reading heads being placed along the surfaces generated by the tape or film being wound against the conical configured flange. The configuration of the reel and flange, as well, is considered to be novel and useful as described herein. The concept of searching the edge or border of the tape or tape edged film is considered a new and useful concept.

The turntable mechanism 22 may be incorporated in a special single spindle scanning device 24 or it may be installed in a storage rack of many spindles for operating all or selected ones of the spindles in the rack, the pick-up assembly being portable on a support arm that may be applied to any spindle shaft and on the rack.

The device shown has a base 26 in which the turntable mechanism and motor 28 is housed. An upright bracket 27 extends from the rear of the base 26 to hingedly support the support arm 30 for swinging the pick-up device away from and into operating relation with the end of the shaft 18. The reading head rack 20 may be vertically adjustable for narrower films in a collar (not shown) which is slidably mounted in the end of the support arm to move the rack 20 with the reading heads along the conically spiral edge of the roll 12 in accordance with the rotation of the shaft 18 which drives the sliding mechanism through the worm 36, gear 38 and suitable rack and gear connections 40.

Obviously, many modifications in the operating mechanisms and details of structure may be made without departing from the spirit and scope of this invention as defined in the appended claims.

What is claimed is:

1. A magnetic tape roll scanning device for quickly locating desired portions of information stored thereon, comprising a tape having a main information track and an edge track on the surface of said tape, a conic ended reel conically supporting a roll of said tape so as to expose the successive convolutions of said edge track on the outer conical surface of said roll, said edge track having a serial coding thereon for identifying said portions in accordance with the information contained on the tape, and an adjustable magnetic pick-up device movable along an element of said outer conical surface formed by the convolutions of said exposed edge track, said device having a plurality of reading heads spaced along said element for cooperation with corresponding portions of said exposed edge track.

2. A magnetic tape roll scanning device as defined in claim 1, including a turntable means at the base of said reel, having a drive shaft extending through and connected to said reel for rotating it with the tape roll supported thereon, a support arm for said pick-up device hinged to a support fixed to a stationary part of said turntable means for swinging said pick-up device out of the way when mounting the reel on or removing it from said shaft.

3. A magnetic tape roll scanning device as defined in claim 2, said support arm having drive means adapted for operative connection to the end of said shaft when said pick-up device is swung into operative position so as to move said reading heads to follow the corresponding edge track portions of the rotating conical roll of tape.

References Cited in the file of this patent

UNITED STATES PATENTS

| | | |
|---|---|---|
| 2,265,879 | Thurm | Dec. 9, 1941 |
| 2,498,746 | Walker | Feb. 28, 1950 |
| 2,680,239 | Daniels et al. | June 1, 1954 |
| 2,706,118 | Camras | Apr. 12, 1955 |
| 2,908,769 | Fonda | Oct. 13, 1959 |
| 3,004,467 | Zschau | Oct. 17, 1961 |